United States Patent [19]

Mizukami et al.

[11] 4,029,404

[45] June 14, 1977

[54] PLATEN COVER FOR A VACUUM CONTACT PRINTER

[75] Inventors: Hidekatsu Mizukami; Kosuke Fukui; Tsutomu Kinoshita, all of Kyoto, Japan

[73] Assignee: Dainippon Screen Seizo Kabushiki-Kaisha, Kyoto, Japan

[22] Filed: Nov. 7, 1975

[21] Appl. No.: 629,841

[30] Foreign Application Priority Data

Sept. 2, 1975 Japan ............................ 50-106400

[52] U.S. Cl. .................. 355/91; 355/76; 355/99

[51] Int. Cl.$^2$ ......................... G03B 27/62

[58] Field of Search ............ 355/91, 92, 94, 87, 355/99, 133, 78, 76

[56] References Cited

UNITED STATES PATENTS

| | | | |
|---|---|---|---|
| 2,584,401 | 2/1952 | Thralls | 355/76 |
| 3,560,089 | 2/1971 | Jones | 355/91 |
| 3,635,559 | 1/1972 | Harrell et al. | 355/91 |
| 3,944,367 | 3/1976 | Hakanson et al. | 355/76 |

*Primary Examiner*—L. T. Hix
*Assistant Examiner*—J. A. LaBarre
*Attorney, Agent, or Firm*—Zarley, McKee, Thomte, Voorhees & Sease

[57] ABSTRACT

In a vacuum contact printer there are provided a winding roller to which one end of a resilient vacuum sheet is attached and a pressure roller for pressing the sheet against a glass plate. Along with the advancement of both rollers, which are rotatably supported on a pair of bearing plates movable in a longitudinal direction, the sheet automatically spreads over the glass plate, being wound off the winding roller and simultaneously being pressed by the pressure roller so that all the air kept between the sheet and the glass plate is completely expelled. In addition, a suctorial operation encourages a closer adhesion of the sheet to the glass plate, whereby a document and a sensitive material placed between them can be sufficiently in close contact with each other. On the other hand, along with the retraction of both rollers, the sheet is automatically and perfectly wound up around the winding roller without any slack or rumple caused thereon, since the pressure roller is raised slightly above the sheet by means of cam plates so as to put no pressure on the sheet.

13 Claims, 6 Drawing Figures

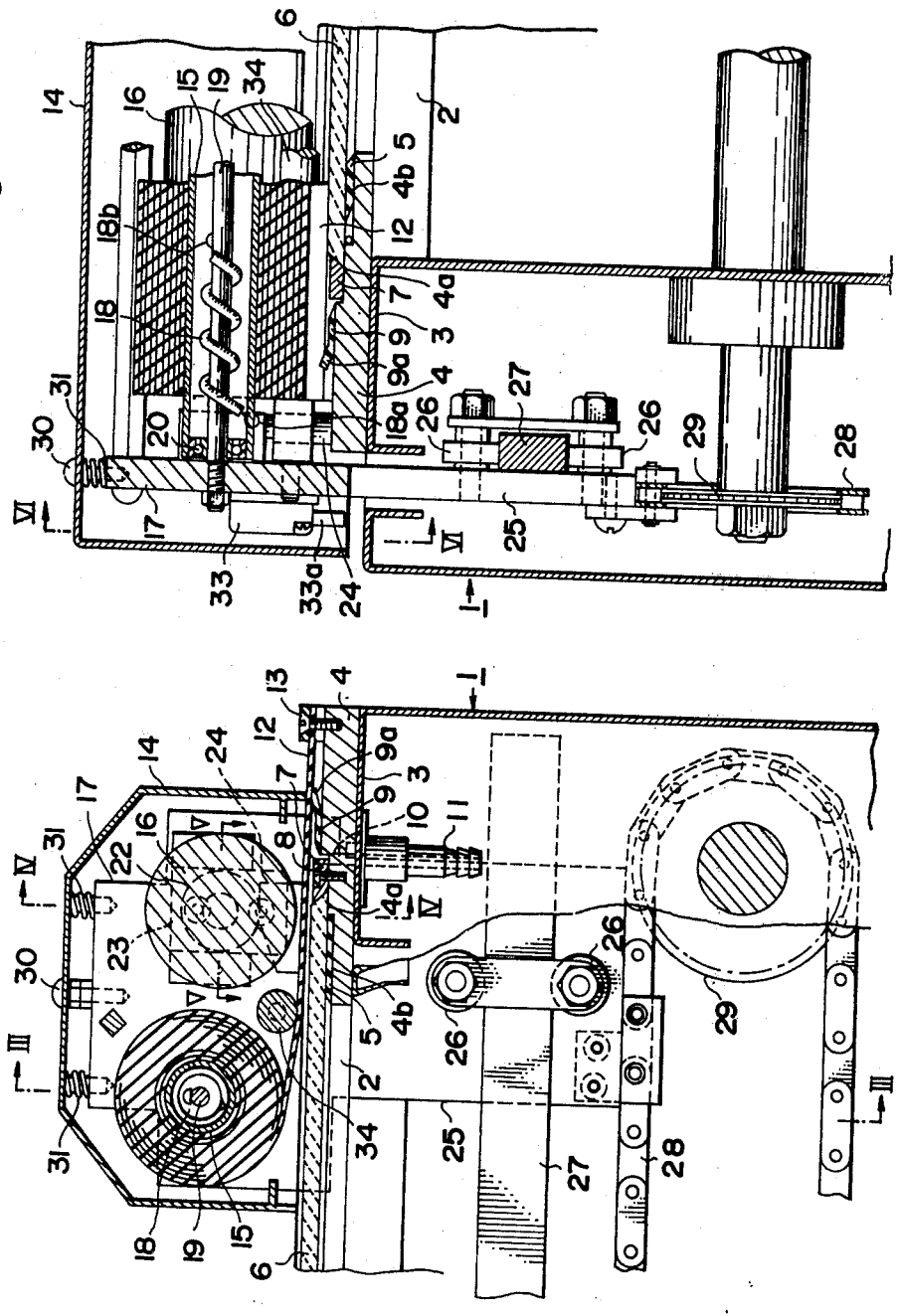

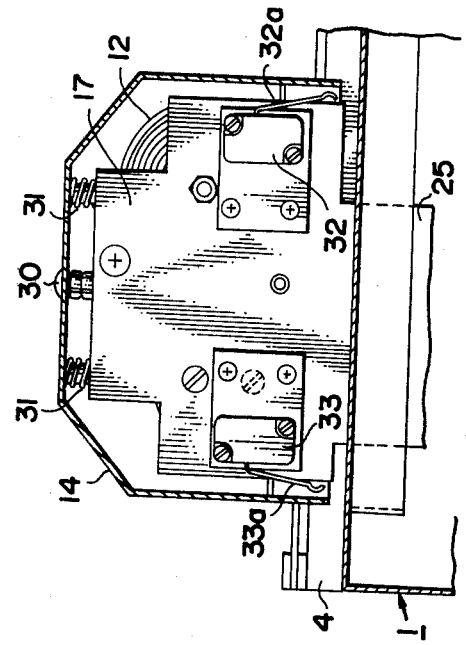
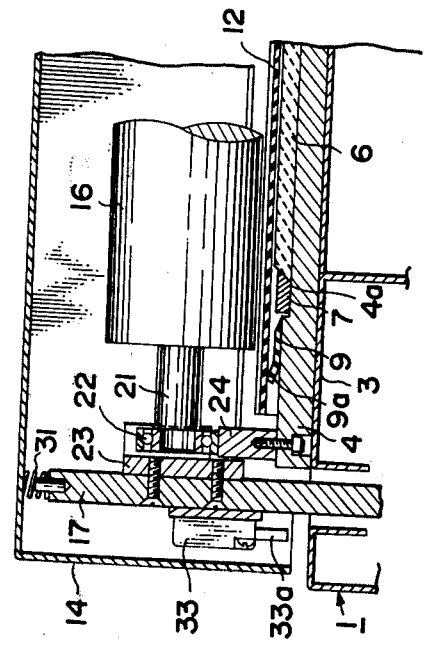
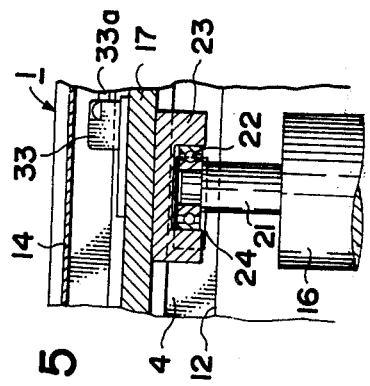

PLATEN COVER FOR A VACUUM CONTACT PRINTER

The present invention generally relates to Contact Printing Apparatus for printing out an image of a document upon a photo-sensitive material such as a film, and more particularly relates to improvements in Vacuum Contact Printer in which a document and a sensitive material are sufficiently in close contact with each other so as to prevent any possible fog or fading area caused by an incomplete contact.

Various types of a Vacuum contact printer, heretofore, have been provided, among which the most well known type is that:

A document and a sensitive material are placed one over the other on a vacuum sheet made of such material as rubber or the like, after which a glass plate is further laid on them to form a sealed portion. Then the air is exhausted from said sealed portion by a suitable air exhauster so that the document and the sensitive material closely adhere to the glass plate and the vacuum sheet.

In such prior art described above, however, it has been difficult to uniformly exhaust the air from the sealed portion, due to which some air bubbles are apt to remain partially between the sensitive material and the document. This has, in most cases, resulted in causing some fog or fading area on the exposed product.

It is therefore a prime object of the present invention to provide an improved vacuum contact printer, which is of relatively simple mechanism, for assuring closer contact of the document and the sensitive material with each other.

It is another object of the present invention to provide an improved vacuum contact printer in which at the same time when a winding roller and a pressure roller move forward a vacuum sheet automatically spreads over a glass plate, and at the same time when both rollers retract the vacuum sheet is automatically wound up around the winding roller.

It is still another object of the present invention to provide an improved vacuum contact printer in which the pressure roller presses the vacuum sheet so tightly enough toward its spreading direction that neither does an air bubble remain between the glass plate and the vacuum sheet, nor is the sheet rumpled.

It is a further object of the present invention to provide an improved vacuum contact printer in which when the both rollers return to their initial positions the sheet can be perfectly wound up around the winding roller without any slack or rumple caused.

The above and other related objects and features of the present invention will become more apparent from the following description of embodiments with reference to the accompanying drawings, in which;

FIG. 1 is a perspective view, when viewed from the front, of one embodiment of a vacuum contact printer according to the present invention.

FIG. 2 partially illustrating a vertical sectional view of a vacuum contact printer, taken along the line II — II of FIG. 1.

FIG. 3 is a partial vertical sectional view of a winding roller, when taken along the line of III — III of FIG. 2.

FIG. 4 is similarly a partial vertical sectional view of a pressure roller, when taken along the line of IV — IV of FIG. 2.

FIG. 5 is a partial sectional view of a pressure roller when taken along the line of V — V of FIG. 2.

FIG. 6 is a sectional view of a movable box-like cover, when taken along the line VI — VI of FIG. 3.

Figure 1:
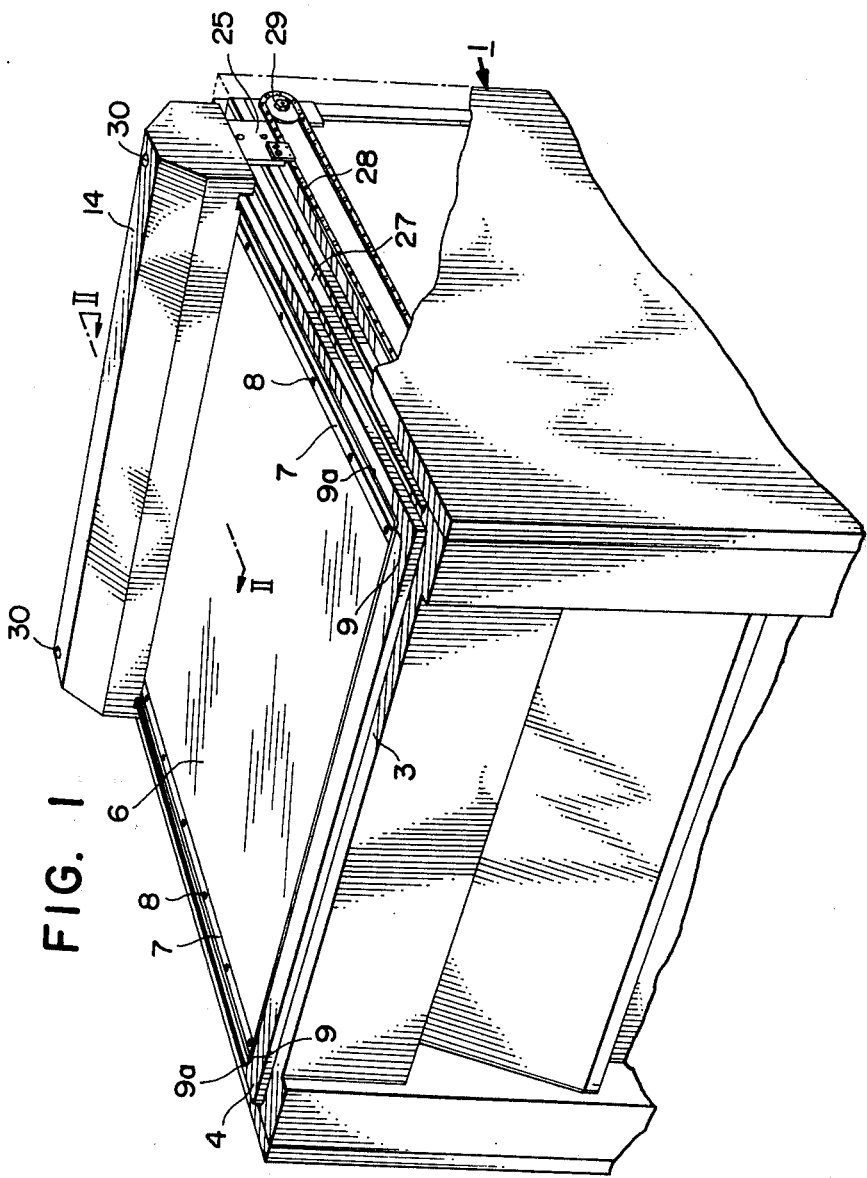

Referring now to the attached drawings, particularly to FIG. 1, there is perspectively illustrated a vacuum contact printer, a body of which is generally designated by the reference numeral 1. Within the body 1, a suitable light source, though not shown, is arranged at the lower portion thereof for the illuminating purpose.

As is shown in FIGS. 1 to 4 inclusive, an opening portion 2, surrounded by a horizontal flange 3 of the body 1, is formed at the top surface of the body 1. A supporting frame 4 is firmly mounted on the top surface of the horizontal flange 3, covering the entire surface of the horizontal flange 3.

On the surface of the horizontal flange 3 and along the inner periphery thereof, there are disposed two steps 4a and 4b which descend innerward. A rubber cushion pad 5 of a similar shape to the supporting frame 4 is mounted on the inner step 4b, whilst a glass plate 6 being placed on another step 4a.

The glass plate 6, the outer edge of which is so shaped as to slope down toward the outer wall of the step 4a, is normally received by means of an edge frame 7 also fixed on the outer step 4a by a plurality of set screws 8 and having an inner inclined edge engageable face-to-face with the outer edge of the plate 6.

As is shown in FIGS. 2 to 4, mounted on the supporting frame 4 adjacent to the outer wall of the step 4 is a frame-shaped rubber packing 9 with its outer edge 9a slightly projecting upward.

From FIG. 2 it will be seen that between the edge frame 7 and the packing 9 a vertically extending suction hole 10 is excavated through the supporting frame 4. This suction hole 10 is connected through a joint member 11 to a suitable suctorial source such as a vacuum pump (not shown).

In FIGS. 1 and 2, a vacuum sheet 12 made of resilient material, for example Mylar of Dupont, has its rear end fixed on the rear portion of the supporting frame 4 by a number of set screws 13.

Reference numeral 14 is generally designating a bottom-opened box-like cover which is disposed on the body 1 of the vacuum contact printer so as to travel back and forth in a longitudinal direction. Within the cover 14, two transverse rollers 15 and 16, one of which is hereinafter called a winding roller 15; the other one to be called a pressure roller 16, are rotatably supported by a pair of vertical bearing plates 17 located at both sides of the body 1.

The winding roller 15, as is particularly seen in FIGS. 2 and 3, is given a turning moment in a clockwise direction, when viewed in FIG. 2, by a coil spring 18, the purpose of which will be described hereinafter in more detail. The fore end of the vacuum sheet 12, which is wound around the winding roller 15, is tightly fixed to a certain portion of the winding roller 15. In other words, the winding roller 15 is supported through a pair of ball bearings 20 by means of a shaft 19 firmly journaled in the pair of vertical bearing plates 17, and one end 18a of the coil spring 18 twisted around the shaft 19 is anchored on the winding roller 15, while the other end 18b similarly on the shaft 19, so as to bias the winding roller 15 in such a direction as mentioned above.

As is illustrated in FIGS. 4 and 5, a pair of ball bearings 22, into which both ends of a shaft 21 secured to the pressure roller 16 are journaled, are slidably and rotatably arranged in a pair of guiding members 23 of channel section disposed on the inner walls of the vertical bearing plates 17.

What should be noted is that each transverse width of the two rollers 15 and 16 is dimensioned in such a manner that both sides of the winding roller 15 be located at a slightly outer position of the out- and upwardly projecting edge 9a of the frame-shaped packing 9 and those of the pressure roller 16 be at a slightly inner position of that edge 9a for the purpose of facilitating a complete coverage of the printing area by the vacuum sheet 12 and a closer adherence of the sheet 12 to the glass plate 6 by the pressure roller 16.

Immediately beneath each guiding member 23, there is also provided a vertically extending cam plate 24 gradually sloping upward adjacent to the rear thereof to present a raised and flat portion. While the movable box-like cover 14 is located at the extreme rear portion, the ball bearing 22 inserted onto the guide member 23 is held mounting on the raised and flat portion of the vertical cam plate 24 thereby raising the pressure roller 16 slightly above the vacuum sheet 12 to release the pressure upon the sheet 12.

On the other hand, if the cover 14 makes a forward movement, the ball bearing 22 will be off the cam plate 24 and the pressure roller 16 will fall down the slope of the cam plate 24 by its own weight.

As can be seen in FIGS. 2 and 3, extending downwardly from the bottom of each bearing plate 17 as a part thereof is a portion representing a supporting plate 25, on the inner surface of which rotatably mounted are two rollers 26 vertically aligned with each other so as to roll back and forth in a longitudinal direction along a rail 27 suitably arranged within the body 1 of the vacuum contact printer of the invention.

An endless chain 28 is secured to either bottom portion of the supporting plates 25, though it is preferable to mount one endless chain on each plate 25. The endless chain 28 is wound around and cooperating with a driving sprocket wheel 29 disposed at the rear of the body 1 and also around another sprocket wheel (not shown) at the front of the body 1.

As best seen in FIG. 2, a bolt 30 is embedded in the center of the top surface of each bearing plate 17, and is passing through the ceiling panel of the cover 14.

There are provided two compression springs 31 respectively between the ceiling panel of the cover 14 and the front and the rear top surfaces of each bearing plate 17. The bottom edges of the cover 14 are slightly spaced apart from the upper surface of the body 1.

It is therefore appreciated that the cover 14 is supported mainly by the bolts 30 which serve as a supporting point so that the cover 14 can swing back and forth in a longitudinal direction about the bolts 30 against the compression springs 31.

Referring now to FIG. 6 showing the movable box-like cover 14 in its cross section, a pair of limit switches 32 and 33 are mounted respectively on the front and the rear portions of the outer wall of either of the bearing plates 17. Each limit switch has an actuator 32a or 33a positioned at a predetermined distance from the inner wall of the cover 14.

This pair of limit switches 32 and 33 play a role in controlling the electrical circuit so as to stop the driving sprocket wheel 29 running or to give a warning sign to an operator whenever necessary during operation. The distance between the actuator, 32a or 33a, and the inner wall of the cover 14 should be so prefixed that the actuator immediately touches the inner wall of the cover 14 to give a warning message when the cover 14 is inclined more than the prefixed safety limit.

In FIG. 2, there is shown another smaller-dimensioned guide roller 34 which is rotatably supported by the side walls of the bearing plates 17 in a position between the two rollers 15 and 16 to guide the vacuum sheet 12 along its travelling path.

With the foregoing descriptions in mind, attention is now directed to the manner of operation of the vacuum contact printer in accordance with the present invention.

First, a document and a sensitive material are suitably placed one over the other on the glass plate 6, after which a suitable power unit (not shown) is run off to rotate the driving sprocket wheel 29 in a required direction, and simultaneously a suction pump (not shown) is set in operation.

Thus, the movable box-like cover 14 as well as the bearing plates 17 will be moved forward through the endless chain 28 cooperating with the driving sprocket wheel 29 and the supporting plate 25. In proportion to the advancement of the bearing plates 17, the winding roller 15 having the vacuum sheet 12 wound around itself is forcibly rotated against the coil spring 18, and the vacuum sheet 12, being wound off the roller 15, will spread in succession not only over the document and the sensitive material but also over the outer edge 9a of the packing 9 placed at the periphery of the glass plate 6.

In this instance, the ball bearings 22 into which both ends of the shaft 21 of the pressure roller 16 are inserted roll down the inclined parts of the cam plates 24, and the pressure roller 16 will also move forward as pressing the spread-over vacuum sheet 12 against the glass plate 6 so as to expel forward all the air kept between the document and the sensitive material.

When the bearing plates 17 have reached the foremost position of the body 1, the area surrounded by the outer edge 9a of the packing 9 is entirely covered by the vacuum sheet 12, and the suction operation working throughout this process assures close contact of the vacuum sheet 12 as well as the document and the sensitive material with the glass plate 6.

An operation, after completing the necessary printing process, for returning the apparatus to the position for next process is as simple as that for printing. Namely, what should be done is to lead the suction hole 10 into the ambient air so as to release the vacuum sheet 12 from an adhesion by suction to the glass plate 6 and to rotate the driving sprocket wheel 29 in an opposite direction so as to facilitate retraction of the movable box-like cover 14 and the bearing plates 17.

Along with the retraction of the cover 14 and the plates 17, the winding roller 15 with a self-rotating tendency given by the coil spring 18 winds the vacuum sheet 12 around itself.

When the cover 14 and the bearing plates 17 have reached the rearmost position, ball bearings 22 ascend the cam plates 24, as a result of which the pressure roller 16 is slightly raised to get the vacuum sheet 12 free from the pressure thereof.

It will be therefore understood that the vacuum sheet 12 is to be perfectly wound up around the winding roller 15 without any slack caused.

If the pressure roller 16 were continuously applying its pressure on the vacuum sheet 12 to the last extremity, it would be unavoidable that some slacks would emerge in the area between the pressure roller 16 and the rear edge of the vacuum sheet 12. These slacks would not only cause incomplete adhesion of the sheet 12 to the glass plate 6, but also become rumples that would adversely affect close, complete and uniform contact of the sheet 12 with the glass plate 6 during the spreading of the sheet 12.

As has been described before, however, it is contemplated according to the present invention that when the cover 14 and the bearing plates 17 retract the sheet 12 will be completely wound up around the winding roller 15, since there is no longer existing any pressure upon the sheet 12. This eliminates the foregoing drawbacks which would occur without the help of the cam plates 24.

In a vacuum contact printer according to the present invention, there is further provided a means for safety 's sake. As mentioned before, the cover 14 supported by the bolts 30 embedded in the bearing plates 17 is capable of slightly swinging back and forth. Accordingly, even if the cover 14 hits an operator or something carelessly placed on the sheet 12, it will incline to a certain degree so that other related parts of the apparatus can be protected from being damaged.

In case the inclination of the cover 14 exceeds a predetermined safety limit, either of the limit switches 32 and 33 with actuators 32a and 33a will be instantly actuated so as to stop an operation or to generate a warning sign to an operator.

Although illustrative embodiments of the present invention have been described in detail heretofore with reference to the accompanying drawings, it should be understood that the invention is not limited to those embodiments described herein, and that various changes and modifications may be made by one skilled in the art without departing from the spirit or the scope of the present invention.

What we claim is:

1. A vacuum contact printer comprising:
   a body having upward light source therein,
   a supporting frame mounted on the top surface of said body and provided with an air-tight resilient packing member at the periphery thereof,
   a transparent hard plate supported on said supporting frame and surrounded by said resilient packing member,
   a resilient vacuum sheet the rear end of which is secured to the rear portion of said supporting frame,
   a pair of vertical bearing plates movable back and forth in a longitudinal direction along said supporting frame,
   a winding roller both ends of which are journaled in said bearing plates and to which the fore end of said vacuum sheet is secured; said winding roller being biased in such a direction that the upper portion thereof is rotated toward the rear of said body,
   a pressure roller rotatably supported on said bearing plates behind said winding roller so as to be vertically movable, and
   guiding means operatively connected to both ends of said pressure roller to cause said pressure roller to ascend so that said pressure roller is raised slightly above said vacuum sheet when said bearing plates are positioned at the rearmost of said supporting frame to reduce the pressure on said vacuum sheet.

2. Apparatus according to claim 1 wherein said air-tight packing member is provided with an up- and outwardly projecting edge.

3. Apparatus according to claim 2 above, wherein said air-tight resilient packing member is comprised of rubber.

4. Apparatus according to claim 1 wherein said transparent hard plate is comprised of glass.

5. Apparatus according to claim 1 wherein said resilient vacuum sheet is comprised of Mylar of Dupont.

6. Apparatus according to claim 1 further characterized in that said winding roller is rotatably mounted on a shaft fixedly journaled in said bearing plates so that a coil spring twisted around said shaft, one end of said spring being anchored on said winding roller while the other end of said shaft, biases said winding roller in one direction.

7. Apparatus according to claim 1 wherein said guiding means comprises vertically disposed cam plates.

8. Apparatus according to claim 7 above, wherein fixed on the inner walls of said bearing plates are vertical guide members of channel section within which ball bearings mounted on said pressure roller are rotatably and slidably disposed.

9. Apparatus according to claim 1 wherein a guiding roller is disposed between said winding roller and pressure roller for guiding said vacuum sheet.

10. Apparatus according to claim 1 further including a bottom-opened movable box which covers said bearing plates, said winding roller and said pressure roller.

11. Apparatus according to claim 10 wherein said movable box is supported by bolts embedded in the center of the top surface of said bearing plates so that said box can slightly swing back and forth in a longitudinal direction.

12. Apparatus according to claim 11 above wherein swinging movements of said box are controlled by means of two pairs of compression springs disposed respectively between the ceiling panel of said box and the front and the rear surfaces of said bearing plates.

13. A vacuum contact printer comprising:
   a body having upward light source therein,
   a supporting frame mounted on the top surface of said body and provided with an air-tight resilient packing member at the periphery thereof,
   a transparent hard plate supported on said supporting frame and surrounded by said resilient packing member,
   a resilient vacuum sheet the rear end of which is secured to the rear portion of said supporting frame,
   a pair of vertical bearing plates movable back and forth in a longitudinal direction along said supporting frame,
   a winding roller both ends of which are journaled in said bearing plates and to which the fore end of said vacuum sheet is secured; said winding roller being biased in such a direction that the upper portion thereof is rotated toward the rear of said body,
   a pressure roller rotatably supported on said bearing plates behind said winding roller so as to be vertically movable,
   guiding means operatively connected to both ends of said pressure roller to cause said pressure roller to ascend so that said pressure roller is raised slightly above said vacuum sheet when said bearing plates are positioned at the rearmost of said supporting frame to reduce the pressure on said vacuum sheet, a bottom-opened movable box covering said bearing plates, said winding roller and said pressure roller, said movable box being supported by bolts embedded in the center of the top surface of said bearing plates so that said box can slightly swing back and forth in a longitudinal direction, said swinging movements of said box being controlled by means of two pairs of compression springs disposed respectively between the ceiling panel of said box and the front and the rear surfaces of said bearing plates, and a pair of electrically-controlled limit switches provided at the front and the rear portions of either of said bearing plates for stopping an operation of the apparatus or for giving a warning message whenever an inclination of said body exceeds a predetermined safety limit.

* * * * *